United States Patent [19]

Terpak

[11] 3,966,139

[45] June 29, 1976

[54] TEXTILE SERVING SPOOL

[75] Inventor: Anthony Terpak, Key Biscayne, Fla.

[73] Assignee: Owens-Corning Fiberglas Corporation, Toledo, Ohio

[22] Filed: Aug. 19, 1974

[21] Appl. No.: 498,676

[52] U.S. Cl. .......................... 242/118.7; 242/118.62
[51] Int. Cl.² .......................................... B65H 75/14
[58] Field of Search ......... 242/118.7, 118.61, 118.4, 242/77.3, 118.62, 118.5

[56] References Cited
UNITED STATES PATENTS

| | | | |
|---|---|---|---|
| 2,651,476 | 9/1953 | Morin | 242/118.7 |
| 3,105,655 | 10/1963 | Park et al. | 242/118.7 X |
| 3,270,980 | 9/1966 | Philips | 242/118.7 |
| 3,334,841 | 8/1967 | Burhop | 242/118.61 |

FOREIGN PATENTS OR APPLICATIONS 698,486 10/1953 United Kingdom............. 242/118.7

Primary Examiner—Leonard D. Christian
Attorney, Agent, or Firm—John W. Overman; Paul J. Rose

[57] ABSTRACT

An improved plastic spool for serving electrical insulation, such as glass fiber yarn, about a continuous wire is provided having a better combination of strength and breakability properties than prior spools. The spool is made by joining two identical molded halves, and comprises a hollow tubular core and radially extending flanges at each end of the core. The flanges are tapered in thickness and are reinforced by integrally molded stiffening ribs. The flanges are provided with grooves along which the plastic will fracture, which grooves are aligned with slots in the core. The slots extending axially along the core but terminate a distance from each flange such that the core is not weakened, yet the fractures along the groove lines will propagate across the remaining solid plastic continuum and connect with the slots to fragment the spool into pieces. The spool also includes a paper insert which lines the core of the spool for snug engagement with a mandrel.

6 Claims, 7 Drawing Figures

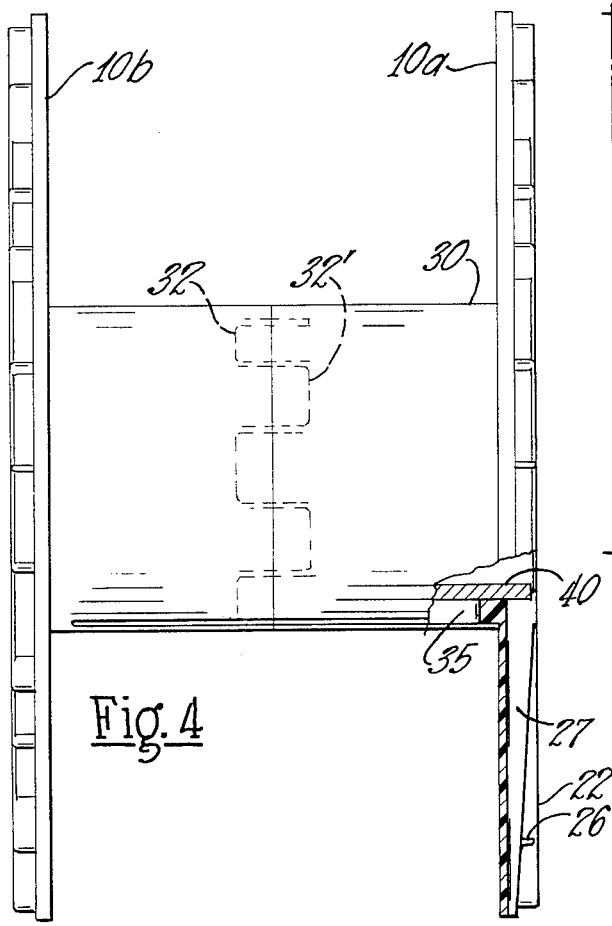
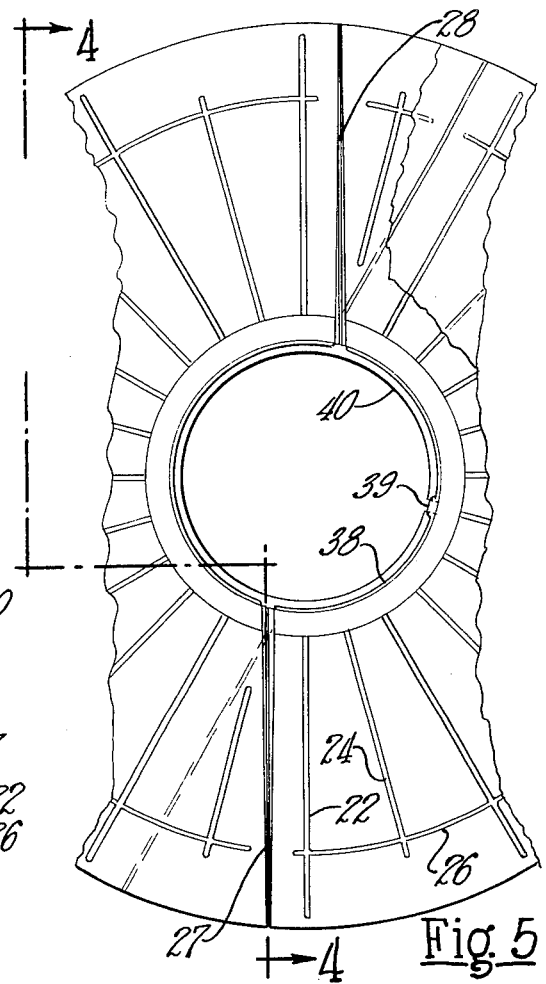
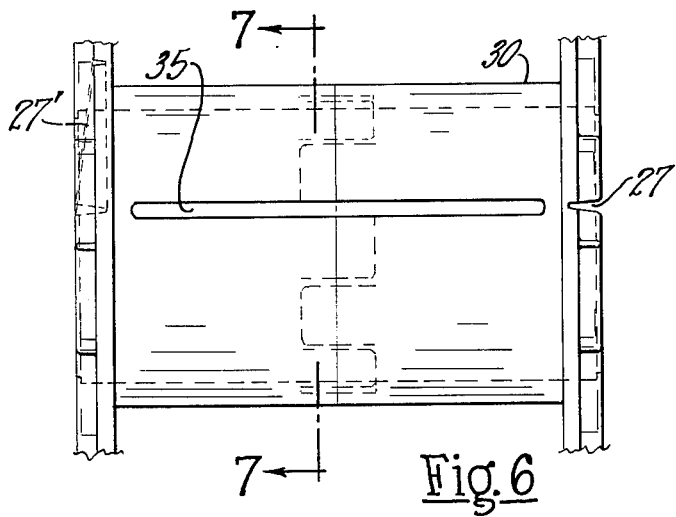
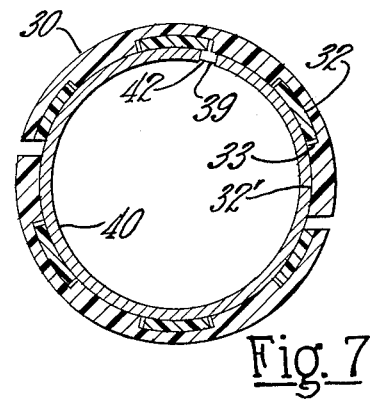

TEXTILE SERVING SPOOL

This invention relates to an improved spool for serving thread, yarn, or the like, and in particular to a one-piece plastic spool for serving electrical insulation, such as glass fiber yarn, about a continuous magnet wire.

A conventional method of electrically insulating wire, such as magnet wire, consists of passing the wire through a hollow mandrel on which a spool of yarn is placed, and rotating the spool to wind the yarn about the wire. The wire is served continuously from a drum type reel and, after the insulation has been applied, is rewound onto a similar take-up reel. Due to problems with space and inertia very large spools are not practical, and the smaller spools used provide only enough yarn to cover a portion of the length of the wire. Accordingly, a plurality of the smaller spools of yarn are placed in series about the length of wire so the entire length of wire can be covered as it is fed from reel to reel.

As each yarn serving spool is emptied, it must be removed from its surrounding relationship with the wire and replaced on the mandrel with a full spool. The wire feeding operation is halted while the empty spool is removed and replaced. The end of the full spool of yarn is tied to the end of the yarn extending from the covering already on the wire and the wrapping operation is continued until this second spool is emptied. This sequence of operation is repeated until the entire length of wire is covered with insulation.

The yarn spool must be constructed so it can be readily removed from its surrounding relationship with the wire without severing the wire. At the same time the spool must be strong enough to provide support for the tensioned yarn package, both during shipment and during the wire covering operation. The serving spools developed heretofore have not accomplished these dual requirements to the degree achieved by the present invention.

A typical spool consists of a tubular core with wide annular flanges at each end of the core. The earliest spools were made of cardboard. Although these spools could easily be cut or torn for removal from around the wire, they were limited in strength, especially in the flanges. Accordingly these spools limited the shape and type of yarn packages with which they could be used.

For example, by reason of the inability of the cardboard flanges to provide sufficient lateral support for the package during the unwinding operation, it was necessary to provide a stable yarn package having a low way wind. However the cross winding necessary for the building of a stable package presented problems during the serving operation. In rotation of the package, the lineal serving speed of the yarn would be non-uniform or jerky even though the spool was rotated at a uniform speed. In many instances, the revolutionary speed of the spool is in the order of 5400 rpms or more during the unwinding operation, and the non-uniform, jerky feed of the yarn would in many instances result in skips in the wire covering. In addition the jerky operation can be damaging to a somewhat brittle material such as glass fiber yarn.

Later developed spools made use of stronger flanges of molded plastic, first on a cardboard or paper core, and later integral with the core in one-piece plastic spools. These spools were suitable for restraining a parallel wound yarn package which would unwind uniformly. To make the plastic spools breakable for removal from around the wire they were modified by molding grooves into the flanges. The flanges could then be broken along these grooves.

In the one-piece all plastic spool, grooves are also molded in the core and extend axially from end to end of the core in alignment with the grooves in the flanges. This spool is fractured along the groove lines in both the flanges and along the core for removal from around the wire and mandrel. However until the improvements made by the present invention, difficulty in making a clean and dependable fracture of the prior art spools remained a problem.

It is the principal object of this invention to provide a serving spool of the type generally described having a better combination of strength and breakability than the spools of the prior art.

It is also an object of the invention to provide a one-piece plastic serving spool of a construction which achieves maximum strength with a minimum of plastic material.

Finally it is an object of the invention to provide a plastic spool of the general type described which is susceptible of simple and economical manufacture.

In brief summary, the invention is a one-piece plastic spool, assembled from two symmetrical molded halves, having greater strength in the end flanges to support parallel wound textile packages and adapted for easy breaking to fragment the spool for removal from about a wire or mandrel. The flanges are tapered in thickness, being thickest near the core and gradually decreasing in thickness to the outer peripheral edge, to minimize the amount of plastic used. The flexural strength and stiffness of the flanges is improved by radial and circumferential stiffening ribs molded in the outer flange surface.

Radially extending grooves are provided in each flange to serve as lines of fracture. Slots extending through the plastic wall are provided in the core of the spool. These slots are axially aligned between corresponding pairs of grooves in the flanges. But unlike the grooves in the cores of prior art spools, the slots do not extend all the way to the flanges. Rather they terminate a relatively short distance from the flange leaving a continuum of plastic at the ends of the spool. These plastic continuums at the end of the core make it stiff enough to withstand the compression of the tension wound textile package. At the same time it has been demonstrated that when the flanges are broken along their groove lines the fracture will propagate across the short continuum of plastic and joint the slots in the core whereby the spool becomes separated into two or more pieces and falls away from the mandrel or wire.

The spool of the invention also includes a paper or cardboard liner within the core. This liner adapts the spool for snug fit with the rotating mandrels of the wrapping equipment. The liner is slit from end to end and inserted in the plastic core with the slit in co-operative engagement with an integrally molded ridge or register in the core's inner surface. This co-operative engagement prevents rotational slippage between the liner and spool. Inwardly extending lips at each end of the core also prevent axial movement of the liner relative to the spool.

The spool is made by molding two symmetrical halves in a simple two-piece mold. Each half comprises one flange and half of the spool core. The free end of the core portion is provided with alternate grooves and fingers which interlock with corresponding grooves and fingers of the other section. The two sections can be permanently joined in interlocking engagement by an adhesive between the mating surfaces, or preferably by fusing the mating surfaces together.

The invention will be better understood and additional features of it recognized from the more detailed description which follows with reference to the attached drawings, of which:

FIG. 4 is another elevational view of the spool of FIG. 1;

FIG. 5 is a partial view in elevation of an end flange of the spool of FIG. 1 and particularly showing the grooves and stiffening ribs incorporated in the flange;

FIG. 6 is a partial view in elevation of the spool of FIG. 1, showing the core portion of the spool and a slot in the core; and FIG. 7 is a view in section through the core of the spool as taken along the line 7—7 in FIG. 6.

Figure 1:
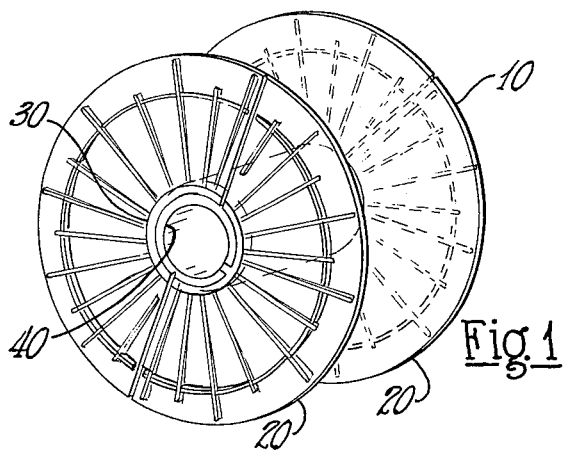
FIG. 1 is a general view in perspective of a textile serving spool embodying the invention.

As shown in the drawings, the spool includes a hollow tubular core 30 about which a textile material, such as glass fiber yarn, is wound under substantial tension. Wide annular flanges 20 at each end of the core support the ends of the textile package, especially a parallel wound package, and also protect the textile material from damage. The spool 10 also includes a compressible liner 40 of paper or cardboard which adapts the spool for a snug fit about a rotating mandrel.

Figure 3:
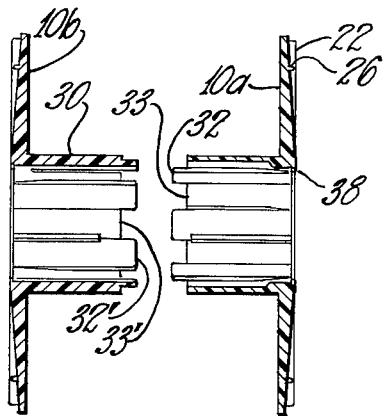
FIG. 3 is an elevational view in section taken along the line 3—3 in FIG. 2 and showing the interlocking joint between the two halves of the spool.

Referring to FIGS. 3 and 4, the spool is molded as two symmetrical sections 10a and 10b. The free end of the core portion of section 10a is provided alternately with extending fingers 32 and grooves 33 in the inner surface which interlock with the corresponding grooves 33' and fingers 32' respectively of section 10b to form the one-piece spool. Although the two sections can be joined together by an adhesive, such as a plastic cement, it has been found preferable to fuse them together, such as by sonic welding.

By the unique design of the spool section it can be molded in a simple two piece mold. By contrast the prior art plastic spools were molded as one piece and required more complex and expensive mold equipment. In addition the prior art spools were produced with a mold line extending diametrically across the flanges and axially along the core. Any flashing along the mold line would cause abrasion of a glass yarn or strand. The present spool can be produced without such a mold line.

As a further manufacturing advantage over prior art plastic spools, the spool of the invention offers a materials savings. Through the novel design of the core sections 10a and 10b and the flanges 20, less thickness and therefore less plastic, is used to provide comparable or improved strength for those components. As shown in FIG. 3, the flanges 20 are tapered from a maximum thickness at the core to a minimum at the outer peripheral edge.

Figure 2:
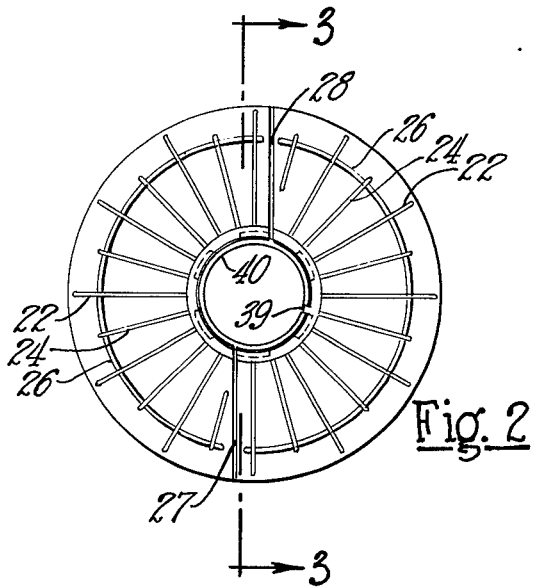
FIG. 2 is a side elevational view of the serving spool of FIG. 1.

Although some prior art spools also have tapered flanges, the taper in the present spool is complemented by stiffening ribs on the outer surface of the flanges. These stiffening ribs compensate for any loss of strength or stiffness due to the taper, and can be selectively placed to strengthen the spools in the areas where strength is most needed. Although a variety of rib patterns and shapes will occur to those skilled in the art, the ribs 22 and 24 are shown extending radially in FIG. 2, and are complemented by a rib 26 extending circumferentially around the outer portion of the flange. The radial ribs 22 and 24 divide the flange into a number of pie shaped sectors according to design requirements. The reader will notice that the ribs 22 extend further than the ribs 24. Since the greatest lateral pressure exerted on the flanges by the textile package is exerted nearer the center of the spool, it is unnecessary to extend all the ribs needed in the central region to the outer region. This discriminate use of the stiffening ribs avoids the unnecessary use of plastic.

The circumferential rib 26 stiffens the flange across the numerous sectors, and prevents undesired radial cracks from developing due to handling stresses on the thin outer edge of the flange.

It has also been found that the two piece spool design with stiffening ribs in a pattern such as shown in FIGS. 3 and 4 has less warpage of the flanges, thus providing a smoother running and better looking spool.

The thickness of the ribs 22 and 24 is inversely proportional to the thickness of the tapered flange 20. Thus as shown in FIG. 3, the sum of the flange and rib thickness is essentially constant across the flange.

As mentioned earlier it is necessary to break the spool into sections for removal from around a mandrel or wire. The grooves 27 and 28 in the flange 20 and the slots 35 in the core 30 are provided for this purpose. When a bending moment is applied to the flanges about the groove lines 27 and 28, the plastic will crack or fracture along these lines. Such a bending moment can be applied by holding the spool 10 with one hand on opposite sides of the essentially diametrical pair of grooves and with the thumbs engaging one flange and the fingers the opposite flange and squeezing the flanges together.

Referring to FIG. 5, in prior art spools, the grooves in the flanges were diametrically aligned, and although such an arrangement is suitable, the grooves in the spool of FIG. 5 are slightly offset. Some observations have indicated that the flanges break easier with this groove arrangement.

Also as shown in FIG. 4, the depth of the grooves 27 and 28 varies with the thickness of the flange so that the net amount of plastic to be fractured is constant along the groove. The grooves as shown in FIGS. 4, 5, and 6 are V-shaped in cross section. Although grooves of other cross sections will work well, it is believed that the V-shaped groove focuses the bending stresses at the bottom of the V and produces a smoother more lineal break.

At least two slots 35 are provided in the core, preferably on diametrically opposite sides. The slots extend through the wall of the core and axially along the core in alignment with a pair of corresponding grooves in the flanges. The slots 35 are purposely terminated a short distance from the end flanges, leaving a continuum of plastic such that the core is not weakened by the slots. Thus the core is not compressed out of tolerance by the tension of glass textile material as is wound on the spool.

It has been demonstrated with dependable repetition that the fractures along the grooves 27 and 28 will propagate across the narrow continuum of plastic to the slots 35. When the flanges are broken and the cracks propagates into the slots in the core the spool fragments into at least two pieces for easy removal from around the wire or mandrel.

The spool 10 is adapted for snug fit over appropriately sized mandrels by the cardboard or paper insert 40. The insert is slit from end to end for insertion in the core 30. To prevent rotation of the insert relative to the spool, a register 42 is molded on the inner surface of the core and co-operatively engages the opened slit 39 in the insert. An inwardly extending lip or flange 38 is molded integrally in the spool at each end of the core. The lip 38 retains the insert 40 against longitudinal movement within the spool.

The spool 10, as described along with its various features above, has proven to provide a dependable combination of properties which make it particularly well suited for serving an insulation such as glass fiber yarn about a wire passing through the center of the spool. When made from a moldable plastic material, such as polystyrene, the spool is strong enough to support a high tension, parallel wound package of glass yarn. At the same time the spool can be readily broken, with predictable results, for removal from about the wire.

Although the invention has been described in detail as related to one embodiment, other embodiments or modifications as may occur to those skilled in the art are also contemplated within its broad scope as defined in the claims which follow.

I claim:

1. A textile serving spool for supporting a strand or yarn wound thereon and adapted for mounting on a rotatable mandrel and for serving the strand or yarn about a continuous object passing axially through the center of the mandrel, the spool comprising a hollow cylindrical core and a pair of integral annular flanges respectively at opposite ends of the core, the core and flanges being made of breakable material, each of the flanges having grooves in its surface extending between inner and outer peripheries thereof and corresponding to like grooves in the opposite flange to form pairs of grooves, the core having a slot for each pair of grooves, and having a rib extending axially along the interior thereof, each slot extending radially through the wall of the core and axially along the core between corresponding grooves but terminating a short distance from each of the flanges to leave continuums of breakable material respectively at opposite ends of the core whereby when the flanges are fractured by breaking along the grooves the lines of fracture propagate across the continuums of material to the corresponding slots in the core and the core and flanges separate into at least two pieces for easy removal from the mandrel, and a liner in the core effective to frictionally engage with the mandrel, the liner having a slit extending from end to end to permit removal thereof from around the mandrel and being disposed in the core with the slit cooperatively engaging the rib extending axially along the interior of the core whereby the liner cannot rotate relatively to the core.

2. A textile serving spool as claimed in claim 1 wherein the core and flanges are molded of breakable plastic.

3. A textile serving spool as claimed in claim 1 including inwardly extending flanges respectively at opposite ends of the core to restrain the liner from moving relatively to the core axially thereof.

4. A textile serving spool for supporting a strand or yarn wound thereon and adapted for mounting on a rotatable mandrel and for serving the strand or yarn about a continuous object passing axially through the center of the mandrel, the spool being made of breakable material and comprising a hollow cylindrical core and a pair of integral annular flanges respectively at opposite ends of the core, each of the flanges having grooves in its surface extending between inner and outer peripheries thereof and corresponding to like grooves in the opposite flange to form pairs of grooves, the core having a slot for each pair of grooves, each slot extending radially through the wall of the core and axially along the core between corresponding grooves but terminating a short distance from each of the flanges to leave continuums of breakable material respectively at opposite ends of the core whereby when the flanges are fractured by breaking along the grooves the lines of fracture propagate across the continuums of material to the corresponding slots in the core and the spool separates into at least two pieces for easy removal from the mandrel, the thickness of each flange decreasing from its inner periphery to its outer periphery and the depth of each groove in the flange varying with the thickness of the flange in such a manner that the thickness of material to be broken along the bottom of the groove is constant across the flange, and radially extending, integral stiffening ribs on the surface of each flange, the thickness of the ribs being inversely proportional to the thickness of the flange whereby the thickness of the flange plus the thickness of the ribs is constant across the flange.

5. A textile serving spool as claimed in claim 4 including at least one circumferentially extending rib on the surface of each flange.

6. A textile serving spool for supporting a strand or yarn wound thereon and adapted for mounting on a rotatable mandrel and for serving the strand or yarn about a continuous object passing axially through the center of the mandrel, the spool being made of breakable material and comprising a hollow cylindrical core and a pair of integral annular flanges respectively at opposite ends of the core, each of the flanges having grooves in its surface extending between inner and outer peripheries thereof and corresponding to like grooves in the opposite flange to form pairs of grooves, the core having a slot for each pair of grooves, each slot extending radially through the wall of the core and axially along the core between corresponding grooves but terminating a short distance from each of the flanges to leave continuums of breakable material respectively at opposite ends of the core whereby when the flanges are fractured by breaking along the grooves the lines of fracture propagate across the continuums of material to the corresponding slots in the core and the spool separates into at least two pieces for easy removal from the mandrel, the spool being formed of two identical molded portions each having a cylindrical core section, an annular flange at one end of the core section, and alternate fingers and grooves extending from the other end of the core section which interlock with corresponding grooves and fingers of the other molded portion when the molded portions are joined together to make the spool.

* * * * *